US008352966B2

(12) United States Patent
Clayton et al.

(10) Patent No.: US 8,352,966 B2
(45) Date of Patent: Jan. 8, 2013

(54) SYSTEM AND METHOD OF INTER-WIDGET COMMUNICATION

(75) Inventors: Gary Clayton, Daly City, CA (US);
Victor Chen, Saratoga, CA (US);
Athellina Athsani, San Jose, CA (US);
Ron Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1346 days.

(21) Appl. No.: 11/853,781

(22) Filed: Sep. 11, 2007

(65) Prior Publication Data

US 2009/0070409 A1   Mar. 12, 2009

(51) Int. Cl.
*G06F 9/44* (2006.01)
*G06F 3/00* (2006.01)
(52) U.S. Cl. ......... 719/328; 715/749; 715/750; 715/762
(58) Field of Classification Search .................. 719/310, 719/311, 312, 328; 709/203; 715/749, 750, 715/762
See application file for complete search history.

(56) References Cited

U.S. PATENT DOCUMENTS

| | | | | |
|---|---|---|---|---|
| 5,710,574 | A * | 1/1998 | Jaaskelainen, Jr. | 715/856 |
| 5,732,228 | A * | 3/1998 | Jaaskelainen, Jr. | 715/862 |
| 5,896,532 | A * | 4/1999 | Blewett | 719/310 |
| 6,237,004 | B1 | 5/2001 | Dodson et al. | |
| 7,269,792 | B2 * | 9/2007 | Consolatti et al. | 715/749 |
| 7,479,949 | B2 * | 1/2009 | Jobs et al. | 345/173 |
| 7,752,556 | B2 * | 7/2010 | Forstall et al. | 715/761 |
| 7,778,792 | B2 * | 8/2010 | Huang et al. | 702/141 |
| 7,849,413 | B2 * | 12/2010 | Hirota et al. | 715/763 |
| 7,873,908 | B1 * | 1/2011 | Varanasi et al. | 715/763 |
| 7,984,384 | B2 * | 7/2011 | Chaudhri et al. | 715/779 |
| 2004/0216042 | A1 * | 10/2004 | Consolatti et al. | 715/513 |
| 2006/0271885 | A1 | 11/2006 | Pittendrigh et al. | |
| 2007/0078953 | A1 * | 4/2007 | Chai et al. | 709/219 |

FOREIGN PATENT DOCUMENTS

| WO | 2009036093 A3 | 3/2009 |
|---|---|---|
| WO | 2009/036093 A3 | 7/2010 |

OTHER PUBLICATIONS

Pascal Molli, Hala Skaf-Molli, Christophe Bouthier, "State Treemap: an Awareness Widget for Multi-Synchronous Groupware", In: Groupware, 2001, Proceedings, Seventh International Workshop on Sep. 6-8, 2001, ISBN: 0-7695-1351-4; pp. 106-114 (9 pages).
C. Bajaj and S. Cutchin, "Web based Collaborative Visualization of Distributed and Parallel Simulation", pp. 1-13; Department of Computer Sciences and TICAM, University of Texas, Austin, TX 78712, http://www.ticam.utexas.edu/CCV, This research is supported in part by NSF grants CCR-9732306 and KDI-DMS-9873326; In: Parallel Visualization and Graphics Symposium, 1999, Proceedings, 1999 IEEE, Oct. 26, 1999, ISBN: 0-7803-5901-1; pp. 47-54.
SpringWidgets-Beta; http://thespringbox.com/download/; (last visited: Sep. 11, 2007).

(Continued)

*Primary Examiner* — Van Nguyen
(74) *Attorney, Agent, or Firm* — Fiala & Weaver P.L.L.C.

(57) ABSTRACT

A method and apparatus enabling inter-widget communication and control uses a central server to receive selected widgets and settings associated with at least one widget, wherein the received settings are used to at least partly determine the settings of the other selected widgets according to a pre-defined relationship between or among the widgets.

25 Claims, 3 Drawing Sheets

OTHER PUBLICATIONS

Microsoft Sidebar for Windows Vista Beta 2; Gadget Development Overview; http://microsoftgadgets.com/Sidebar/DevelopmentOverivew.aspx; (last visited: Sep. 11, 2007).
Pageflakes; http:pageflakes.com; (last visited: Sep. 11, 2007).

"Adobe Apollo=Acrobat Reader+Flash Player", retrieved from <http://labnol.blogspot.com/2005/12/adobe-apollo-acrobat-reader-flash.html>, Published: Dec. 6, 2005, Retrieved: Jun. 14, 2012, 7 pages.

* cited by examiner

SYSTEM AND METHOD OF INTER-WIDGET COMMUNICATION

BACKGROUND

1. Field of the Invention

Aspects of the present invention relate generally to the ability of widgets to communicate with other widgets and dynamically build their content based on the communication.

2. Description of Related Art

As is known in the art, widgets (also known as gadgets, badges, modules, etc.) offer a simple and easy way for end users to embed various third-party functionality into their web pages, onto their computers, and even onto their mobile devices, including mobile phones, Personal Digital Assistants (PDAs), etc. Widgets may be used to display most anything and examples include modules that show the weather forecast for a particular city or the current stock price of a certain company, etc. The inclusion of a widget in a web page can be accomplished through a JavaScript™ call, an IFRAME element, an EMBED element, or any of a host of other methods which bring the widget code into the web page, where it runs locally within the user's browser (or on a user's desktop, etc.). While the widget code can consist entirely of HyperText Markup Language (HTML), widgets are more commonly developed either in JavaScript™ or Adobe® Flash®.

Traditionally, the content displayed by widgets has been fairly static and is generally limited to data which has been informed by a user's initial input when configuring the widget (e.g., telling a widget that displays weather information to display information related to Orlando, Fla., etc). Moreover, widgets have been generally independent from each other and cannot share content. For example, Yahoo!™ Finance offers a customizable widget for displaying financial information, which can include stock quotes. If a user decides he wants the widget to show stock quotes for a certain stock, he tells the widget which stock he is interested in and from that point on it will display those stock quotes. The widget will display only those stock quotes until the user tells it to display something else; the widget is informed only by the last settings that the user has provided.

Thus, it would be desirable to enable widgets to share information between them and use that information to inform their content. It would also be desirable to control when the widget actually appears on a web page or desktop so that it does not take up valuable space when it is not needed or desired.

SUMMARY

In light of the foregoing, it is a general object of the present invention to generate a widget's content by taking into account the content of other, related widgets.

It is another object of the invention to control the timing and duration of a widget's display on a web page or desktop.

BRIEF DESCRIPTION OF THE DRAWING FIGURES

DETAILED DESCRIPTION

Figure 1:
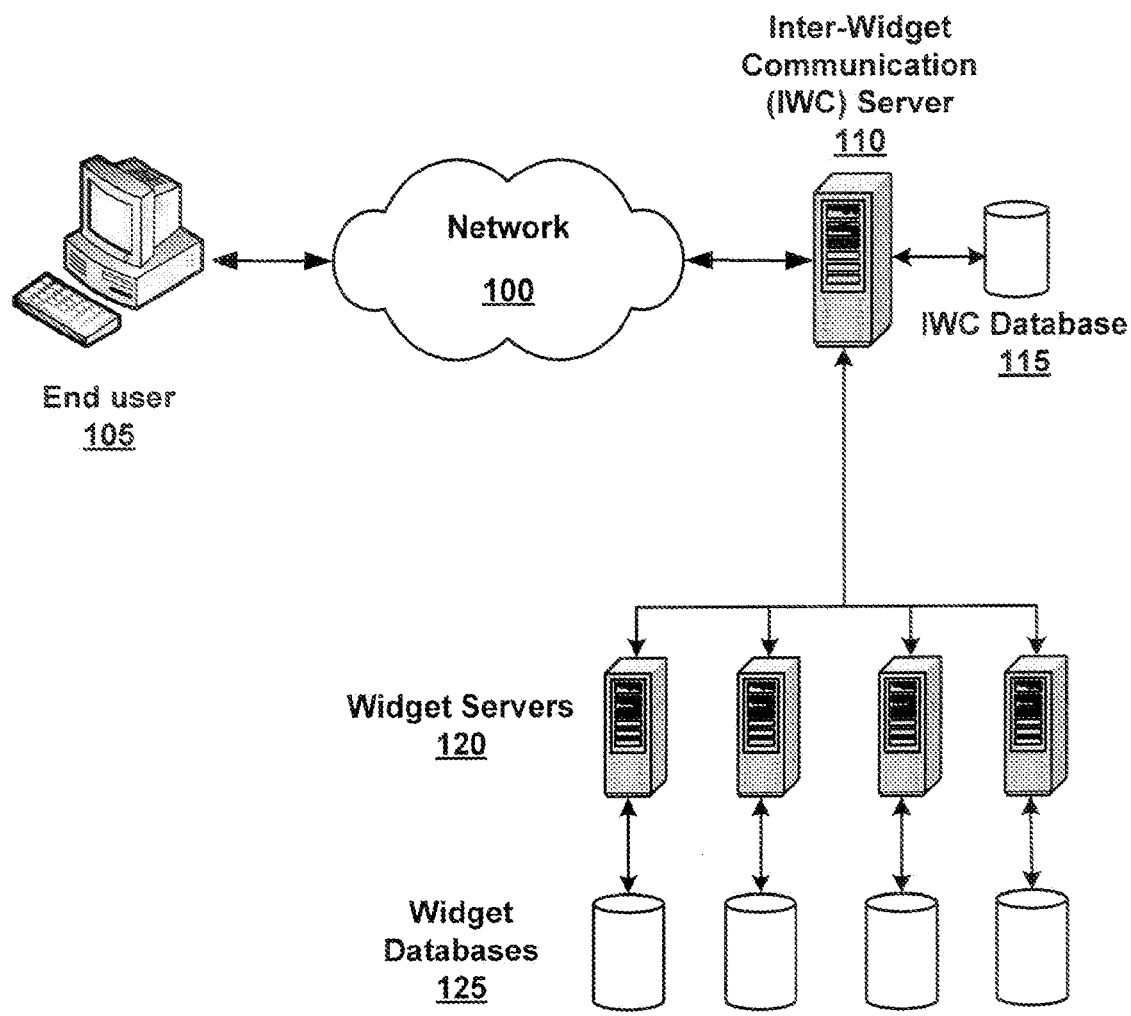
FIG. 1 is a simplified functional block diagram of the general architecture of an exemplary embodiment of the present invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of widgets and widget groups that can derive information from one another and use that information to inform their content.

FIG. 1 is a simplified functional block diagram of the general architecture of an exemplary embodiment of the present invention. An end user 105 interacts (using a computer, a mobile device, etc.), over a network 100 (e.g., the Internet), with Inter-Widget Communication (IWC) Server 110, which may control the data-sharing between the various widgets. IWC Database 115 may store the data-sharing characteristics and settings as entered by the user and processed by IWC Server 110. It will be appreciated by those of skill in the art that the functionality provided by IWC Server 110 and IWC Database 115 may be provided instead by the device used by end user 105 (e.g., computer, mobile phone, PDA, etc.). Widget Servers 120 and Widget Databases 125 may process information requests from IWC Server 110 and send the results back to IWC Server 110, to the widgets themselves, etc. The means through which IWC Server 110, Widget Servers 120, and related databases communicate are non-critical and can include the Internet, Local Area Networks (LANs), fiber, etc.

Inter-widget communication allows one or more widgets belonging to a widget "group," as defined by end user 105, to share their information with each other by referencing a functional relationship between them; the shared information may include the settings or content preferences that each widget requires for its operation (e.g., a weather widget may need to be told which geographic location to monitor, etc.). Further, widget groups may share information between them just as widgets can. In some circumstances, the widget group may share a common, informative goal (e.g., gather all desired information about a particular city, etc.). In one embodiment, the inter-widget communication can be managed and controlled by structuring the functional relationship between the selected widgets in a hierarchical fashion, with a "master" widget and one or more "retainer" widgets." In such a setup, the user chooses a widget to be the master and other widgets to be the retainers. Content preferences that are defined on the master widget "filter" down to the retainer widgets and inform their content, as outlined in more detail below.

Figure 2:
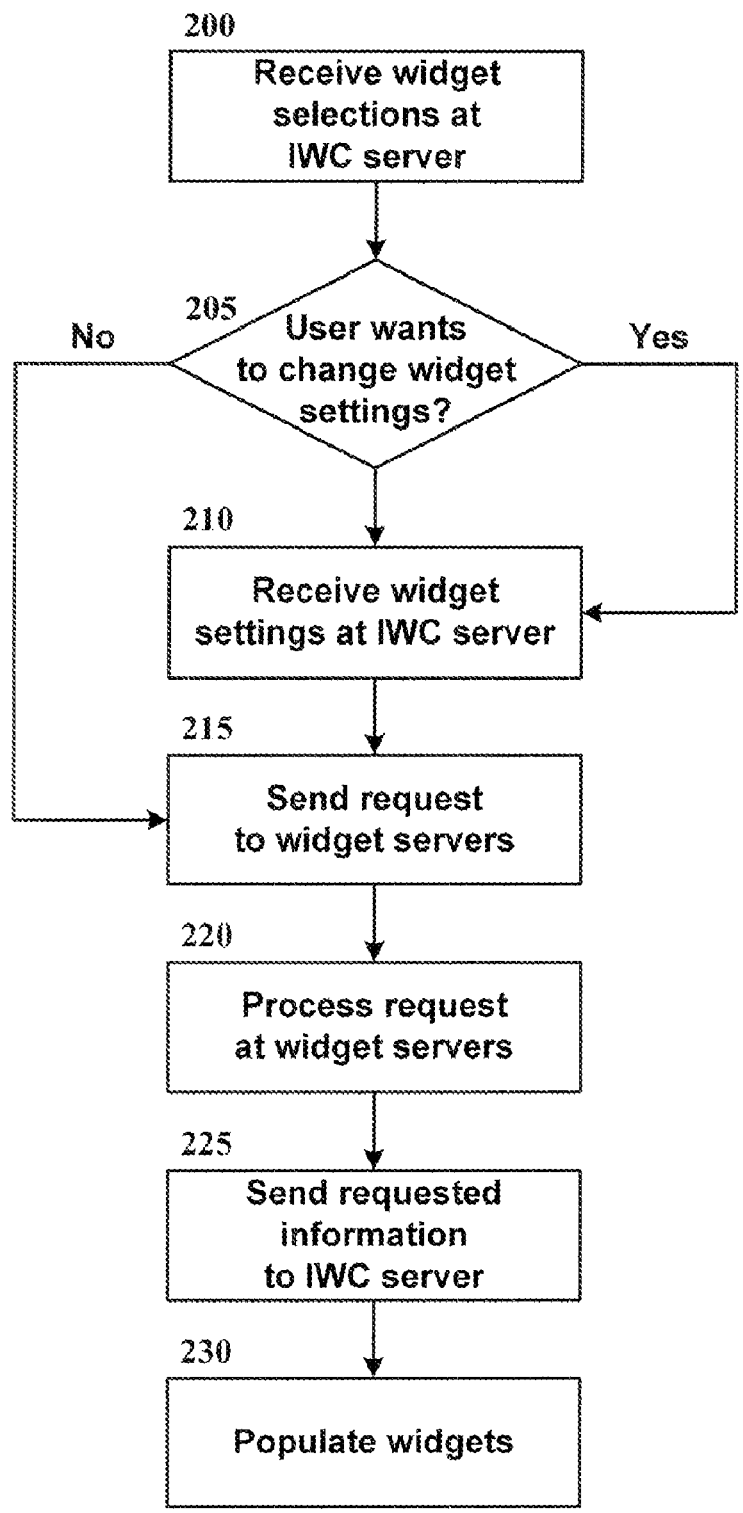
FIG. 2 is a logical flowchart of the general process by which widget hierarchies are set.

FIG. 2 is a logical flowchart of the general process by which widget hierarchies are set and widget content is generated. FIG. 3 is a drawing illustrating the hierarchical operations used to set up the widgets' master-retainer structure. The discussion of both FIG. 2 and FIG. 3 is driven by a specific example below.

As illustrated at block 200, IWC Server 110 receives those widgets selected by a user to belong to the master-retainer group of [inter-related] widgets. For example, assume that the user is trying to decide on a vacation trip to an as yet undetermined location during a certain part of the year, and wishes to base her decision mainly on the cheapest airfare, but would also like to take a few other disparate things into consideration, such as, for example, world news, local news, and weather information for the competing locations. Given the user's goals and restrictions, she may want to choose various widgets to belong to a single group themed around travel (other examples of themes might include investment strategy, car shopping, etc.). These widgets might include those shown in FIG. 3A, namely 1.) "Best Fare Tracker" 300 to monitor the best ticket prices for the competing locations; 2.) "Weather" 305 for reporting the weather forecasts in the competing locations; 3.) "Top Reuters™ Stories" 310; and 4.) "World Reuters™ Stories" 315.

Figure 3A:
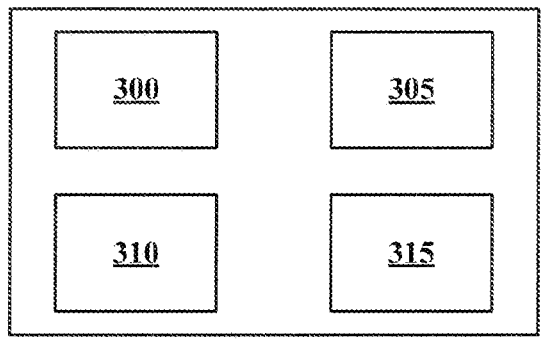
FIG. 3 is a drawing illustrating the hierarchical operations used to set up the widgets' master-retainer structure.
Figure 3B:
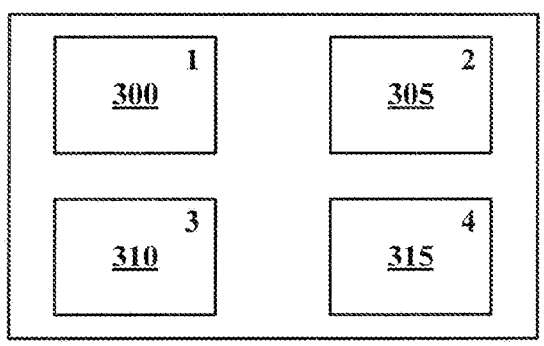
Figure 3C:
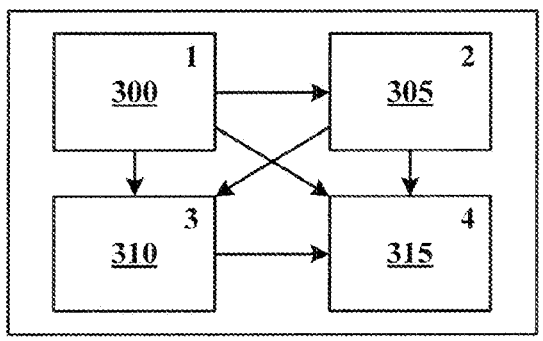

As illustrated at block 205, the user may specify the functional master-retainer relationships used to control the selected widgets (discussed more fully herein), as shown in FIG. 3B. For example, in this situation, because the cheapest airfare is the most important criterion, the user may make the Best Fare Tracker 300 the master widget, and set the remaining widgets up as retainers. FIG. 3B illustrates this functional relationship by assigning to each of the selected widgets a number (e.g., 1, 2, 3, or 4) specifying its position in the hierarchy. The master-retainer relationship may be of varying degrees of elasticity. For example, FIG. 3C illustrates rather 'strict' relationships between each of the widgets; Best Fare Tracker 300 is the master widget and so it influences the content of Weather 305, Top Reuters™ Stories 310, and World Reuters™ Stories 315, as shown by the arrows from Best Fare Tracker 305 to each of the retainer widgets. Similarly, if the retainer widgets do not have relevant content (i.e., content they can use to inform the content of other widgets), the second widget in the hierarchy can assume a "master" role and inform those widgets below it. Also, various and more complex functional relationships may be implemented between the widgets, such as, for example, two-way communication (i.e., the user may wish to have a widget from the 'middle' of the hierarchy influence widgets both above and below it). It also should be noted that while in this example the user has set airfares as the master criterion, the user could just as easily have set weather or local events as the master criterion.

Figure 3D:
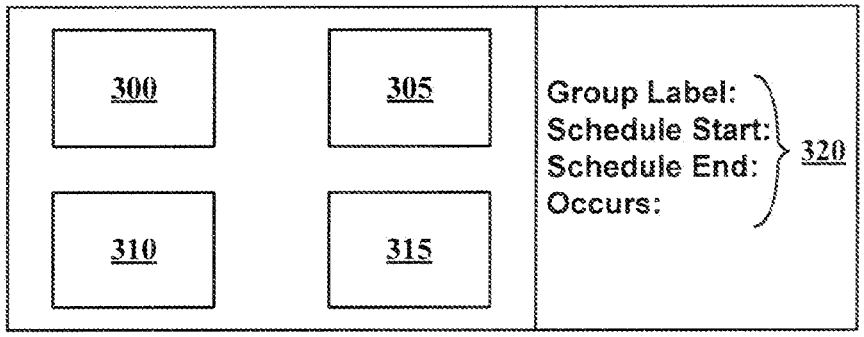

In one embodiment, the user may also be able to define "schedules" for each widget or widget group, as shown in FIG. 3D. Schedule settings 320 may allow the user to specify certain times during which a widget or widget group may appear, and with what frequency. For example, using the travel situation outlined above, the user may wish that the information regarding her travel plans only be shown on her web page or desktop for the next two weeks, and only after 6 PM, when she is out of the office and back home. In this case, the user would define start and end dates and start and end times-of-day. As another example, the user may wish for a traffic information widget to appear on her desktop or web page only between 4:30 PM and 5:30 PM each weekday, so that she can get the most recent traffic information regarding her route home; by defining a schedule and frequency in this way, the user's desktop or web page is not cluttered with useless traffic information (i.e., before 4:30 PM the information provided by the traffic widget is unusable) and the space can be more effectively utilized by, for example, other, more pertinent widgets. Where schedule and frequency settings are enabled, IWC Server 110 may take them into account when deciding which Widget Servers 120 need to be sent information requests; if the schedule and/or frequency settings disallow the to-be-requested information to be shown on the desktop or web page, then the requests may not be sent.

After these settings have been defined, IWC Server 110 may receive and "process" them at block 210, where processing may include various functions, including deciding what information to request from each of Widget Servers 120 based on the hierarchical structure defined by the user. For example, if Best Fare Tracker 300 has some influence over Weather 305, then IWC Server 110 may decide to request weather information from Weather 305 that corresponds to a location the user has specified in Best Fare Tracker 300. The processing functionality may also include the ability to determine whether a widget should display any information at all (as discussed above with reference to FIG. 3D).

After the settings have been processed, information requests may be sent to Widget Servers 120 at block 215. These information requests may work in a number of different ways, depending how Widget Servers 120 are configured.

In one embodiment, Widget Servers 120 may be configured to handle general requests as they normally would (i.e., those requests as would usually come from the widgets they "power"). In that case, the information requests may simply be "custom" or "automated" versions of the requests that would be sent by the widgets themselves. For example, Weather 305 may reside on a user's web page and the user may specify a geographic location for Weather 305 to monitor. Each time Weather 305 updates its information (e.g., once an hour, on every page load, etc.) it must send a request to Widget Server 120. The "custom" or "automated" requests sent by IWC Server 110 (instead of the widgets themselves) may be substantially similar to those usually sent by individual widgets; Widget Server 110 would treat the requests the same no matter how they were carried out (as expounded on below). In one implementation, and still referencing Weather 305, Widget Server 120 may simply supply eXtensible Markup Language (XML)-based feeds (e.g., RSS, Atom, etc.) corresponding to all requested locations and combinations of locations, which are read by Weather 305 using various protocols, such as, for example, the HyperText Transfer Protocol (HTTP), etc. In another implementation, Widget Servers 120 may offer an Application Programming Interface (API) for accessing its information; in such a case, Weather 305 may perform an API call over, for example, the Internet, where it may be received, processed, and responded to by Widget Server 120. Irrespective of how the information is ultimately requested by Weather 305 and received/processed by Widget Server 120, IWC Server 110 may mimic the information request so as to allow Widget Server 120 to operate in substantially the same way it has always operated.

In another embodiment, Widget Servers 120 may be configured in such a way as to offer increased functionality, speed, etc., to those information requests coming from IWC Server 110. For example, Widget Servers 120 may be made aware of some elements of the hierarchical structure used by IWC Server 110 and, in light of this information, may treat a particular request from IWC Server 110 differently than if it had come from an individual widget. As another example, Widget Servers 120 may accept [different] arguments, etc., to information requests if they come from IWC Server 110; such arguments may be used to specify that only a certain amount of data be returned (e.g., only show weather information for the next three days, not an entire week, etc.), or may put a further restriction on the content of the returned data (e.g., only show weather information for location two if it is raining for the next three days at location one, etc.), etc. In such an embodiment, there may exist two separate Widget Servers 120, one for each type of requester (i.e., individual or IWC Server).

Irrespective of the form the information requests take, they are ultimately received and processed by Widget Servers 120, as illustrated at block 220. As discussed in some detail above, Widget Servers 120 parse the information requests and return the data asked of them. For example, an information request for the current weather information at a particular location may be received by Widget Servers 120, in which case the requested information may be compiled (or, as the case may be, the information may already be compiled) and returned. As illustrated at block 225, the requested information is sent from Widget Servers 120 to IWC Server 110.

IWC Server 110 receives the requested information from Widget Servers 120 at block 230. After each of Widget Servers 120 has responded with the requested information, IWC Server 110 may process the information and populate the widgets accordingly. Alternatively, IWC Server 110 may simply act as a "proxy" for the information requests, and in this case, the widgets may be populated by Widget Servers 120 directly; the requested information does not necessarily need to go back through IWC Server 110 before it is received by the widgets.

The hierarchical, master-retainer relationship structure may be set in a number of different ways. In one embodiment, the structure may be defined through a drag-and-drop interface through which the user can choose the widgets to belong to a widget group, and also the relationships among the widgets. For example, the user may be shown a list of available widgets (e.g., a list of widget names, list of previews of the widgets, etc.) and a list of sequential numbers (to represent the levels of the hierarchy); by dragging a widget to a particular number, dragging a number to a particular widget, etc., the user can define the hierarchical structure. As another example, there may be a form next to each available/selected widget where the user can enter a number to specify its position in the hierarchy.

Those of skill in the art will appreciate that the concept of inter-widget communication is not limited to the ideas outlined above. For example, a widget's content does not necessarily have to be informed by another widget, but may in fact be informed by a host of various things (other than an end user). As an example, some Internet companies offer "home" pages (also known as "portals," etc.) that allow users to define their content. That content can sometimes include various widgets as chosen by the user. In many cases, the home page also contains search functionality to allow the user to search the Internet at large, or the particular Internet company's site, etc. In such a situation, the widgets selected by the user could be informed by the terms of their latest search, such that the results page(s) will show not only the regular search results, but also the information received by the various widgets, whose content has been informed by the search terms. For example, a user may search for "Orlando Fla.," and in addition to the regular search results, may receive weather information supplied by a weather widget displayed next to the search results.

The sequence and numbering of blocks depicted in FIG. 2 is not intended to imply an order of operations to the exclusion of other possibilities. It will be appreciated by those of skill in the art that the foregoing systems and methods are susceptible of various modifications and alterations. For example, instead of returning the requested information to IWC Server 110 at block 225, Widget Servers 120 may send the information directly to the widgets themselves. As another example, the reception and processing of the hierarchical and schedule settings at block 210 may take place at the user's device (e.g. computer, mobile phone, PDA, etc.) and not necessarily at IWC Server 110.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of inter-widget communication and control, said method comprising:
   receiving a user selection comprising a plurality of widgets and further comprising an instruction that selects at least one first widget of the plurality of widgets and first widget settings to be associated with the at least one first widget;
   applying the first widget settings associated with the at least one first widget to second widget settings associated with at least one second widget of the plurality of widgets, the first widget settings associated with the at least one first widget at least partly determining the second widget settings associated with the at least one second widget;
   sending information requests to servers associated with each of the plurality of widgets; and
   receiving widget data for each of the plurality of widgets in response to the information requests.

2. The method of claim 1 wherein the first widget settings define the information to be conveyed by at least one of the plurality of widgets.

3. The method of claim 1 wherein the received widget data is received by a user device.

4. The method of claim 3 wherein the selection is received by the user device.

5. The method of claim 1 wherein the plurality of widgets share a common theme.

6. The method of claim 1, further comprising transmitting the received widget data to the plurality of widgets.

7. The method of claim 1 wherein the first widget settings associated with the at least one first widget control the second widget settings associated with the at least one second widget.

8. A system for enabling inter-widget communication and control, said system comprising:
   at least one inter-widget communication (IWC) server receiving a user selection comprising a plurality of widgets and providing information requests related to the plurality of widgets; and
   at least one widget server configured to respond to the information requests;
   the at least one IWC server further receives first widget settings associated with at least one first widget of the plurality of widgets;
   the at least one IWC server applies the first widget settings associated with the at least one first widget to second widget settings associated with at least one second widget of the plurality of widgets, the first widget settings associated with the at least one first widget at least partly determine the second widget settings associated with the at least one second widget; and
   the at least one IWC server receives widget data for each of the plurality of widgets in response to the information requests.

9. The system of claim 8 wherein the first widget settings define the information to be conveyed by at least one of the plurality of widgets.

10. The system of claim 8 wherein the received widget data is received by a user device.

11. The system of claim 10 wherein the at least one IWC server is a user device.

12. The system of claim 8, wherein the at least one IWC server is configured to transmit the received widget data to the plurality of widgets.

13. The system of claim 8 wherein the widget settings associated with the at least one first widget control the widget settings associated with the at least one second widget.

14. A system for enabling inter-widget communication and control, said system comprising:
at least one inter-widget communication (IWC) server that is configured to:
receive a plurality of user-selected widgets including a master widget and at least one retainer widget and user-selected widget settings associated with the master widget;
apply the user-selected widget settings associated with the master widget to widget settings associated with the at least one retainer widget, the user-selected widget settings associated with the master widget at least partly determining the widget settings associated with the at least one retainer widget;
provide information requests related to the plurality of widgets; and
receive widget data for each of the plurality of widgets in response to the information requests; and
at least one widget server configured to respond to the information requests.

15. The system of claim 14, wherein the at least one IWC server is further configured to:
receive an instruction indicating a second master widget in the plurality of widgets and second user-selected widget settings associated with the second master widget;
receive an instruction indicating a hierarchical order among at least a portion of the plurality of widgets;
apply the second user-selected widget settings associated with the second master widget to widget settings associated with other widgets in the plurality of widgets of lower hierarchical order than a hierarchical order of the second master widget, the second user-selected widget settings associated with the second master widget at least partly determining the widget settings associated with the other widgets.

16. The system of claim 15, wherein the at least one server is further configured to:
receive an instruction indicating a third master widget in the plurality of widgets and third user-selected settings associated with the third master widget;
receive an instruction indicating at least one first widget of the plurality of widgets having a hierarchical order; and
apply the third user-selected widget settings associated with the third master widget to other widget settings associated with the at least one first widget, the third user-selected widget settings associated with the third master widget at least partly determining the other widget settings associated with the at least one first widget.

17. The system of claim 16, wherein the third user-selected widget settings associated with the third master widget inform content of the at least one first widget.

18. The system of claim 15, wherein the second user-selected widget settings associated with the second master widget inform content of the other widgets of the lower hierarchical order than the hierarchical order of the second master widget.

19. The system of claim 14, wherein the user-selected widget settings associated with the first master widget inform content of the at least one retainer widget.

20. A method of inter-widget communication and control, said method comprising:
receiving a plurality of user-selected widgets including a master widget and at least one retainer widget and user-selected widget settings associated with the master widget;
applying the user-selected widget settings associated with the master widget to widget settings associated with the at least one retainer widget, the user-selected widget settings associated with the master widget at least partly determining the widget settings associated with the at least one retainer widget;
sending information requests to servers associated with each of the plurality of widgets; and
receiving widget data for each of the plurality of widgets in response to the information requests, the widget settings associated with the master widget influencing the widget data received for the at least one retainer widget.

21. The method of claim 20, further comprising:
receiving an instruction indicating a second master widget in the plurality of widgets and second user-selected widget settings associated with the second master widget;
receiving an instruction indicating a hierarchical order among at least a portion of the plurality of widgets;
applying the second user-selected widget settings associated with the second master widget to widget settings associated with other widgets in the plurality of widgets of lower hierarchical order than a hierarchical order of the second master widget, the second user-selected widget settings associated with the second master widget at least partly determining the widget settings associated with the other widgets.

22. The method of claim 21, further comprising:
receiving an instruction indicating a third master widget in the plurality of widgets and third user-selected settings associated with the third master widget;
receiving an instruction indicating at least one first widget of the plurality of widgets having a hierarchical order; and
applying the third user-selected widget settings associated with the third master widget to other widget settings associated with the at least one first widget, the third user-selected widget settings associated with the third master widget at least partly determining the other widget settings associated with the at least one first widget.

23. The method of claim 22, wherein the third user-selected widget settings associated with the third master widget inform content of the at least one first widget.

24. The method of claim 21, wherein the second user-selected widget settings associated with the second master widget inform content of the other widgets of the lower hierarchical order than the hierarchical order of the second master widget.

25. The method of claim 20, wherein the user-selected widget settings associated with the first master widget inform content of the at least one retainer widget.

* * * * *